(12) United States Patent
Guymon et al.

(10) Patent No.: US 9,114,473 B2
(45) Date of Patent: Aug. 25, 2015

(54) ROBOTIC PRE-HEAT AND INTER-PASS WELDING

(71) Applicant: RIMROCK AUTOMATION, INC., Fort Collins, CO (US)

(72) Inventors: Lance F. Guymon, Fort Collins, CO (US); Jon Kramer, Fort Collins, CO (US); Zachary Bennett, Fort Collins, CO (US); James R. Pring, Fort Collins, CO (US); Steve Carey, Fort Collins, CO (US); Brent Wessel, Fort Collins, CO (US)

(73) Assignee: WOLF ROBOTICS, LLC, Fort Collins, CO (US)

(*) Notice: Subject to any disclaimer, the term of this patent is extended or adjusted under 35 U.S.C. 154(b) by 318 days.

(21) Appl. No.: 13/652,204

(22) Filed: Oct. 15, 2012

(65) Prior Publication Data
US 2013/0277344 A1 Oct. 24, 2013

Related U.S. Application Data

(60) Provisional application No. 61/547,014, filed on Oct. 13, 2011.

(51) Int. Cl.
*B23K 11/25* (2006.01)
*B23K 9/095* (2006.01)
*B23K 9/12* (2006.01)
*B23K 9/235* (2006.01)
*B23K 5/18* (2006.01)

(52) U.S. Cl.
CPC ............. *B23K 9/0953* (2013.01); *B23K 5/18* (2013.01); *B23K 9/126* (2013.01); *B23K 9/235* (2013.01); *Y10S 901/42* (2013.01)

(58) Field of Classification Search
CPC ....... B23K 9/0953; B23K 9/126; B23K 9/235
USPC ................ 219/125.1, 124.31, 137 R, 124.34
See application file for complete search history.

(56) References Cited

U.S. PATENT DOCUMENTS 4,973,813 A * 11/1990 Mitchell .................... 219/109
2001/0025847 A1 * 10/2001 Bickel et al. ............... 219/617

* cited by examiner

*Primary Examiner* — Brian Jennison
(74) *Attorney, Agent, or Firm* — William W. Cochran; Cochran Freund & Young LLC

(57) ABSTRACT

Disclosed is a robot pre-heat and inter-pass welding device that is capable of pre-heating and welding one or more weld joints using a single robot. Pre-heating and welding models are used to ensure that a desirable pre-heat temperature is maintained on the weld piece at the location of the weld. Infrared temperature sensors are utilized to detect temperature of the weld piece, which are transmitted to a controller, which controls the operation of both the pre-heating and welding. Multiple welds can be performed if additional time is needed for cooling, which reduces the overall time required to perform the welding process.

6 Claims, 15 Drawing Sheets

240 Flow Chart for Preheat Model

ROBOTIC PRE-HEAT AND INTER-PASS WELDING

CROSS-REFERENCE TO RELATED APPLICATION

This application is based upon and claims priority to U.S. provisional application Ser. No. 61/547,014, filed Oct. 13, 2011, entitled "Robotic Pre-Heat and Inter-Pass Welding," which application is specifically incorporated herein by reference for all that it discloses and teaches.

BACKGROUND

Pre-heating of metals prior to welding involves heating base metal pieces in the region surrounding a weld joint to a suitable pre-heat temperature. Pre-heating slows the cooling rate in both the weld metal and the base metal, which produces a more ductile metallurgical structure with greater resistance to cracking. Further, a slower cooling rate allows hydrogen, that may be present in the weld, to diffuse from the weld, which reduces the potential for cracking. Also, slower cooling rates reduce the shrinkage stresses in the weld in adjacent base metal.

After pre-heating is performed, additional heat is added during the welding process. After each weld bead is laid, the inter-pass temperature, which is the base metal temperature at the location where the next weld is to begin after the last bead has been laid, necessarily needs to be within a suitable pre-heat temperature range to produce desired results. Pre-heat temperature ranges may vary according to the base metals employed, as well as the thicknesses of these sections and types of welds to be made. Code requirements, in certain situations, require pre-heating prior to initiating the welding process. Hence, pre-heating can be an important factor in performing proper welding processes.

SUMMARY OF THE INVENTION

An embodiment of the present invention may therefore comprise a method of automatically preheating and welding a weld piece using a robot comprising: obtaining welding parameters for a planned weld of a weld piece; entering the welding parameters in a preheat and welding model; generating operating parameters for preheating and welding the weld piece using the preheat and welding model; performing a sample weld using the operating parameters; collecting empirical data from the sample weld; comparing the empirical data with operating parameter limits; performing the preheating and welding process on the weld piece if the operating parameter limits are not exceeded; modifying the preheat and welding model if the operating parameter limits are exceeded using the empirical data to produce a modified preheat and welding model for performing the preheating and welding process on the weld piece.

An embodiment of the present invention may further comprise a system for automatically preheating and welding a work piece comprising: a robot having a robot arm; a tool changer interface mounted on the robot arm; a preheat torch having a preheat torch interface that couples to the tool changer interface on the robot arm so that the robot can access the preheat torch to preheat the weld piece and dock the preheat torch in a docking station; a welding gun having a welding gun interface that couples to the tool changer interface on the robot arm so that the robot arm can access the welding gun to weld the weld piece, and dock the welding gun in the docking station so that a single robot can perform both preheating and welding; a controller that uses welding parameters of a first weld piece in a preheat and welding model to generate operating instructions to control the robot to automatically preheat the weld piece so that the weld piece has a temperature level that is within a range of predetermined preheat temperatures during the weld.

DETAILED DESCRIPTION OF THE EMBODIMENTS

Figure 1:
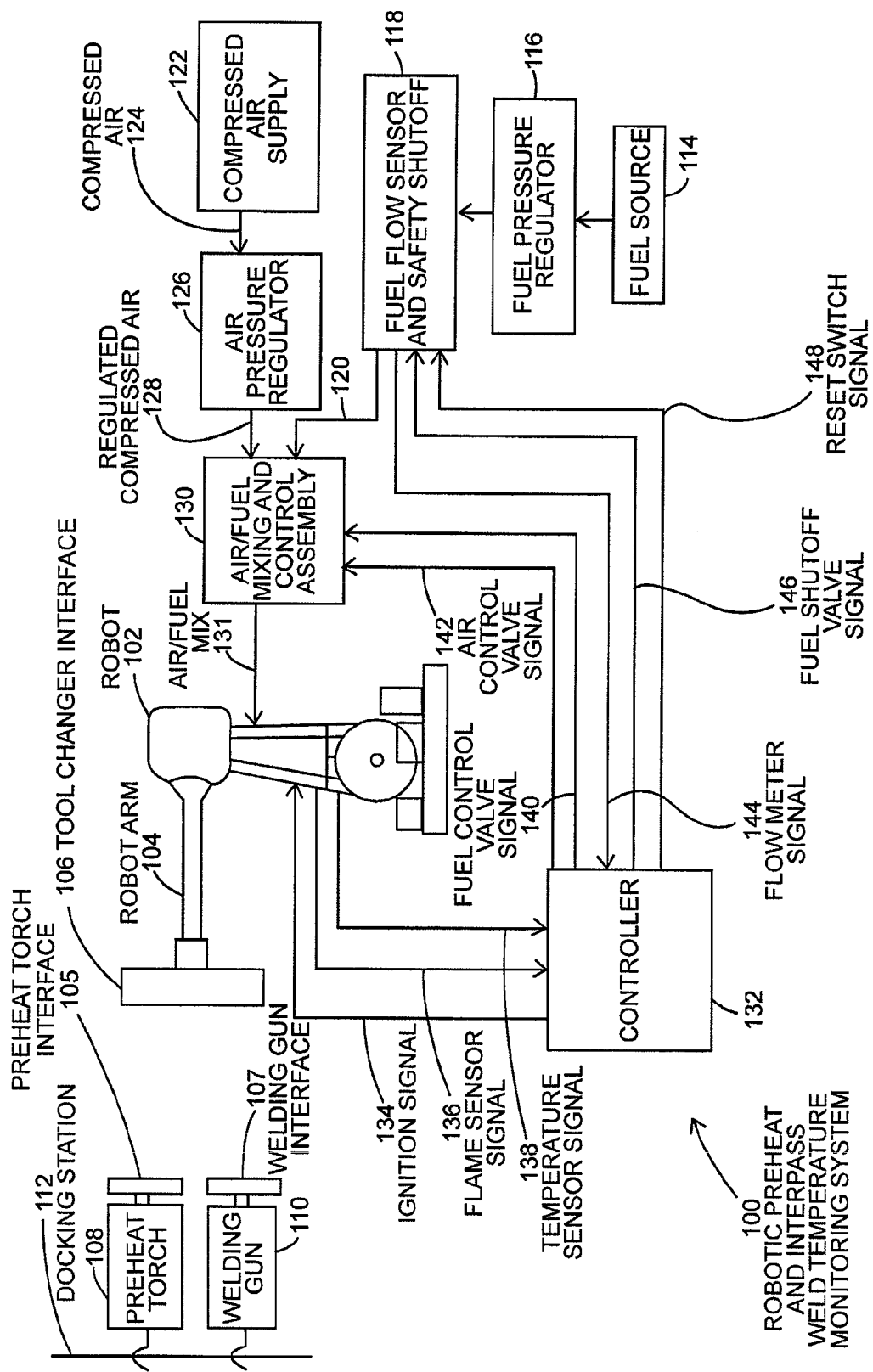
FIG. 1 is a schematic block diagram of an embodiment of a pre-heat system.

FIG. 1 is a schematic block diagram of an embodiment of a robotic pre-heat and inter-pass weld temperature monitoring system. As shown in FIG. 1, a robot 102 has a robot arm 104 that connects to a tool changer interface 106. Tool changer interface 106 is adapted to interface with the pre-heat torch interface 105 and welding gun interface 107. Pre-heat torch 108 and welding gun 110 may be secured in a docking station 112 when not in use. Robot 102 can move to a position so that the tool changer interface 106 can couple with the pre-heat torch interface 105 to perform pre-heating operations, and couple to welding gun interface 107 to perform welding operations with welding gun 110. Welding gun 110 is typically an arc welding gun, but may comprise any desired type of welding gun. Arc welding may be performed in the presence of various gases, which flow through the tool changer interface 106 and welding gun interface 107.

Pre-heat torch 108, illustrated in FIG. 1, performs a process of pre-heating a weld joint on a weld piece by moving the robot 102 and robot arm 104 along the weld joint. Pre-heat torch 108 uses an air/fuel mixture 131 from the air/fuel mixing and control assembly 130, which is ignited in the pre-heat torch 108 to perform the pre-heating process. Ports on the tool changer interface 106 and pre-heat torch interface 105 supply gas to the pre-heat torch 108. Fuel for the pre-heat torch 108 is supplied by fuel source 114. Fuel pressure regulator 116 regulates the pressure of the gas that comprises the fuel for the pre-heat torch 108. The regulated gaseous fuel is then supplied to fuel flow sensor and safety shutoff 118. Fuel flow sensor and safety shutoff 118 is mounted some distance from the pre-heat torch 108 and the welding gun 110 for safety reasons. The gaseous fuel 120 is supplied to air/fuel mixing and control assembly 130. Gaseous fuel is mixed with regulated compressed air 128 from air pressure regulator 126. Compressed air supply 122 supplies compressed air 124 to the air pressure regulator 126. The air/fuel mixing and control assembly 130 provides a proper mix of air and fuel to have a lean, hot burning, clean flame from the pre-heat torch 108 that does not leave soot on the weld joint. Arc welding requires that the joints be clean and free of debris for proper welding. Hence, the flame supplied by the pre-heat torch 108 must be a clean, hot flame that does not deposit soot on a weld joint. Air/fuel mixing and control assembly 130 includes a ramp valve that rapidly increases the compressed air after ignition to provide a clean, hot flame. For example, the ramp valve may ramp up the flow of compressed air in approximately one second to minimize the amount of generated soot from rich mixture flames and ensure that the flame does not blow out. One of the concerns in ramping up the flow of compressed air is that the flame may be blown out on the pre-heat torch 108. Hence, the rate at which the compressed air is added to the fuel by the air/fuel mixing and control assembly 130 to prevent soot buildup, while also preventing the flame from being blown out on the pre-heat torch 108, must be carefully controlled.

In that regard, a flame sensor 167 (FIG. 3) is included in the pre-heat torch head 108 that constitutes an ultraviolet detector that detects the existence of the flame from the pre-heat torch 108. The flame sensor 167 (FIG. 3) generates a flame sensor signal 136 that is transmitted to controller 132. Robot 102 also includes a temperature sensor that comprises an infrared detector that detects the temperature of the weld joint. The temperature sensor 162 (FIG. 2) generates a temperature sensor signal 138 that is supplied to controller 132. Controller 132 generates an ignition signal 134 and the flame is ignited in pre-heat torch 108 whenever the flame is accidentally extinguished, or upon initiation of a pre-heat process, as indicated by the flame sensor signal 136.

Controller 132, illustrated in FIG. 1, also generates an air control valve signal 142 and fuel control valve signal 140, that are transmitted to the air fuel mixing and control assembly 130. The air control valve signal controls the opening and closing of a ramp valve to supply the regulated compressed air 128 to the pre-heat torch 108. Fuel control valve signal 140 controls the amount of gaseous fuel in the air/fuel mixing and control assembly 130 that is applied to the pre-heat torch 108 using the "ramp valve" that is disposed in the air/fuel mixing and control assembly 130. The "ramp valve" is a domed regulator with a needle valve controlled by one side of the dome. Of course, any type of valve that can be controlled to ramp the flow of the gaseous fluid can be used. The fuel flow sensor and safety shutoff 118 generate a flow meter signal 144 that is applied to controller 132. When an alarm condition exists, and controller 132 detects the flow of fuel, as indicated by the flow meter signal 144, a fuel shutoff valve signal 146 is generated, which is applied to the fuel flow sensor and safety shutoff 118 to shutoff the flow of fuel 120 to the air/fuel mixing and control assembly 130. Once the alarm condition is no longer present, a reset signal 148 is generated by controller 132, that is applied to the fuel flow sensor safety shutoff 118, to allow fuel to flow to the air/fuel mixing and control assembly 130. Hence, controller 132 is capable of controlling the flow of air and fuel to the pre-heat torch, provides an ignition signal for igniting the flame, and receives a temperature sensor signal 138 indicating the temperature of the weld joint. In other words, the fuel flow sensor and safety shutoff 118 provides a flow meter signal 144 that indicates the gas is flowing to the air/fuel mixing and control assembly 130. If the robot 102 is not requesting flow, an alarm signal is generated by the controller 132 and a fuel shutoff valve signal 146 is applied to the fuel flow sensor and safety shutoff 118 to shutoff the flow of fuel. Alternatively, the fuel flow sensor and safety shutoff 118 can be replaced with a valve that can be controlled with a fuel shutoff valve signal 146 and reset switch signal 148. An additional valve can then be added at the output of the air/fuel mixing and control assembly 130, which can also be controlled by the fuel shutoff valve signal 146 and reset switch signal 148. The redundancy of having two valves provides a similar safety factor that the fuel flow sensor and safety shutoff 118 provides for the system illustrated in FIG. 1. In addition, the use of two valves is somewhat simpler and less expensive. In addition, a safety signal can be used in place of the flow meter signal 144 that indicates the operational state of a valve that replaces the fuel flow sensor and safety shutoff 118, as well as another valve at the output of the air/fuel mixing and control assembly 130.

Figure 2:
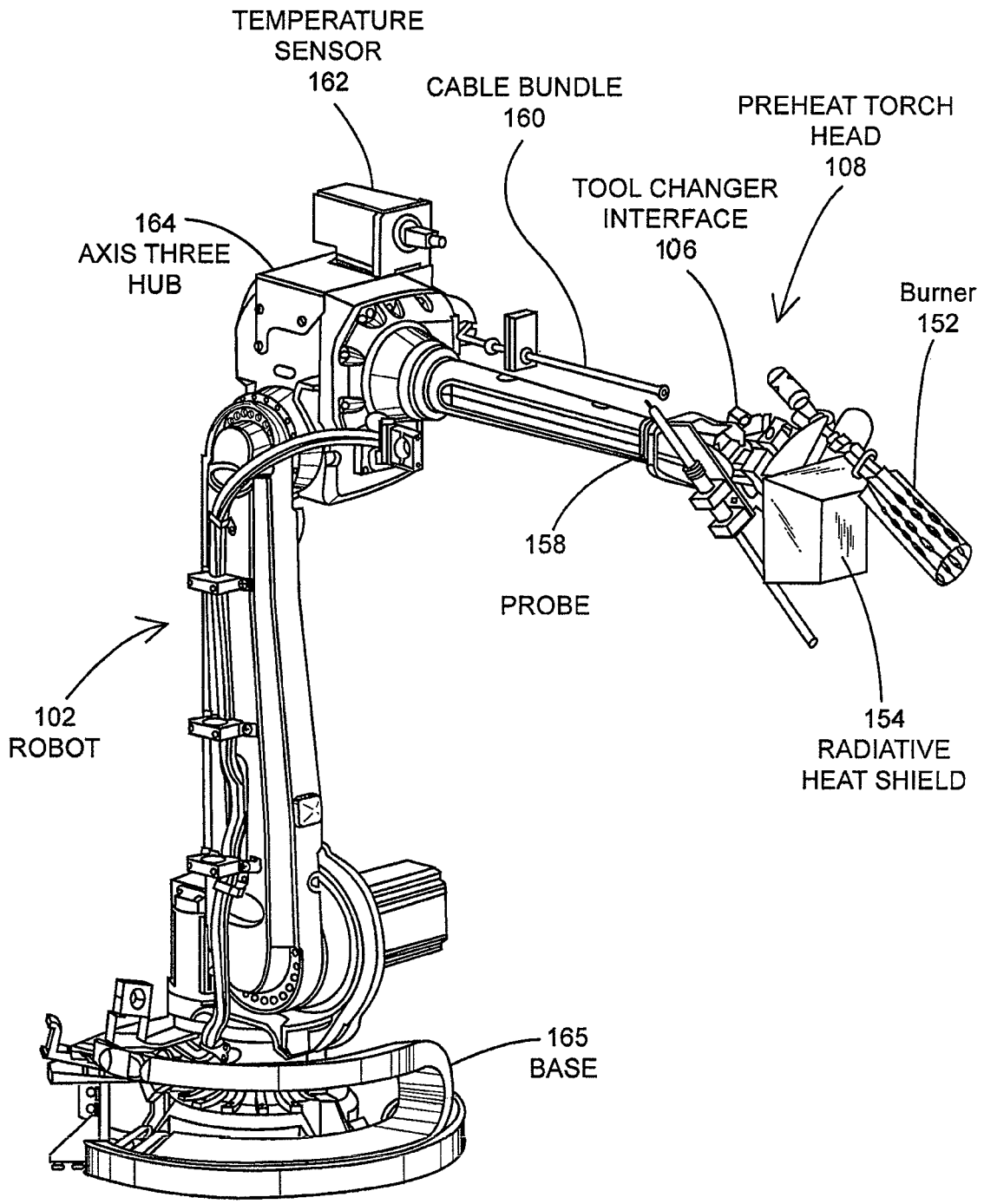
FIG. 2 is an isometric view of an embodiment of a robot equipped to perform pre-heating.

FIG. 2 is an isometric view of one embodiment of a robot 102 for performing pre-heat operations. As shown in FIG. 2, robot 102 is coupled to a pre-heat torch head 108. The pre-heat torch head includes a nozzle or burner 152 that projects a flame onto the weld joint for pre-heating. A radiative heat shield 154 surrounds the components of the pre-heat tool head 108 to protect these components from radiative heat from the pre-heated pieces. A simple metal shield can be used as a radiative heat shield. Probe 158 is also mounted on the pre-heat torch head 108. The probe 158 is directed towards the weld joint to determine the temperature of the weld joint as a result of pre-heating. The probe 158 may be a fiber-optic probe that detects the infrared radiation emitted by the weld piece and transmits the infrared radiation to the temperature sensor 162. The temperature sensor 162 then measures the intensity of the infrared radiation to generate a temperature signal. Alternatively, probe 158 may simply detect the infrared radiation and generate an electrical signal that is transmitted to the temperature sensor 162 that indicates the level of infrared radiation generated by the weld piece. Both of these products are available from Williamson (www.williamsonir.com; Williamsom, 70 Domino Drive, Concord, Mass. 01742; Reference Pro-62 and Silver Series sensors; Particular model number of sensor is configured based on emmisivity and target temperature of parts in the end user's application). Cable bundle 160 includes the cable that connects the probe 158 and temperature sensor 162. Temperature sensor 162 receives the infrared temperature signals from the probe 158 and transmits the temperature sensor signal 138 (FIG. 1) to controller 132 (FIG. 1), as set forth above. Temperature sensor 162 is mounted on the axis three hub 164 of robot 102. Base 165 of robot 102 is typically mounted on a track. Motors mounted in the base 165 are capable of driving the robot 102 along the tracks to position the robot 102 in the proper location for both pre-heating and welding along the length of the weld piece, or weld pieces, to be welded.

Figure 3:
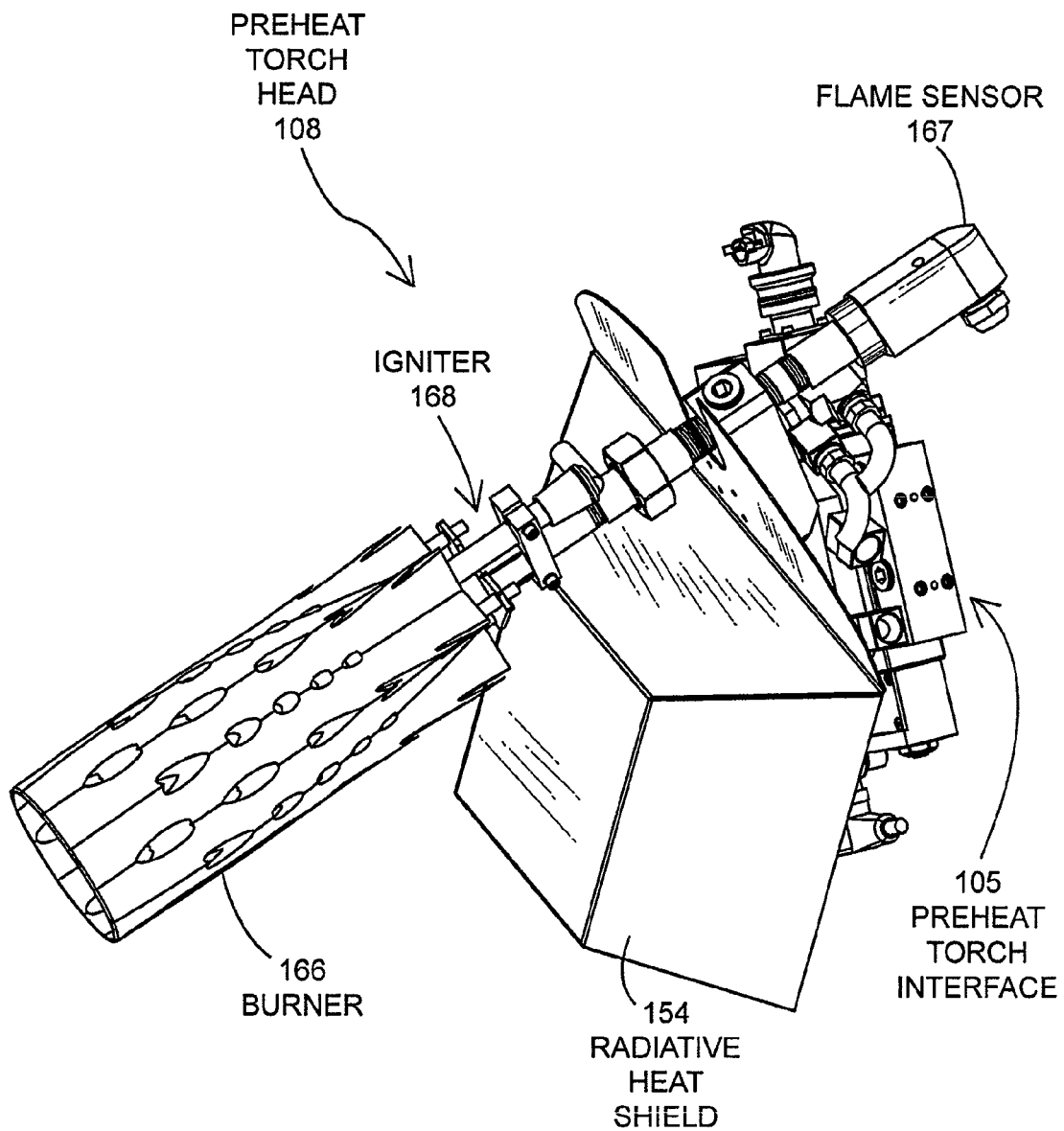
FIG. 3 is an isometric view of an embodiment of a pre-heat torch head.

FIG. 3 is a perspective view of a pre-heat torch head 108. The pre-heat torch head 108, as illustrated in FIG. 3, includes a nozzle or burner 166 that directs a flame to a weld joint. An igniter 168 is used to ignite the air fuel mixture in response to an ignition signal 134 created by controller 132 (FIG. 1). Flame sensor 167 detects the presence of a flame so that igniter 168 can relight the torch if the torch is accidentally blown out. The radiative heat shield 154, as set forth above, is a sheet metal shield that blocks the IR radiative heat from the weld joint, burner 166, and the flame generated by the pre-heat torch 108. The radiative heat shield 154 protects the components of the pre-heat torch 108. Pre-heat torch interface 105 couples to the tool changer interface 106. When not in use, the pre-heat torch 108 is docked in a docking station 112 (FIG. 1). For example, pre-heating can be performed by the pre-heat torch 108, as illustrated in FIG. 3. Once the pre-heating cycle is completed, the robot 102 may park the pre-heat torch 108 in the docking station 112 and retrieve the welding gun 110 for welding. In this manner, only a single robot 102 is required to automatically pre-heat and weld one or more weld pieces.

Figure 4:
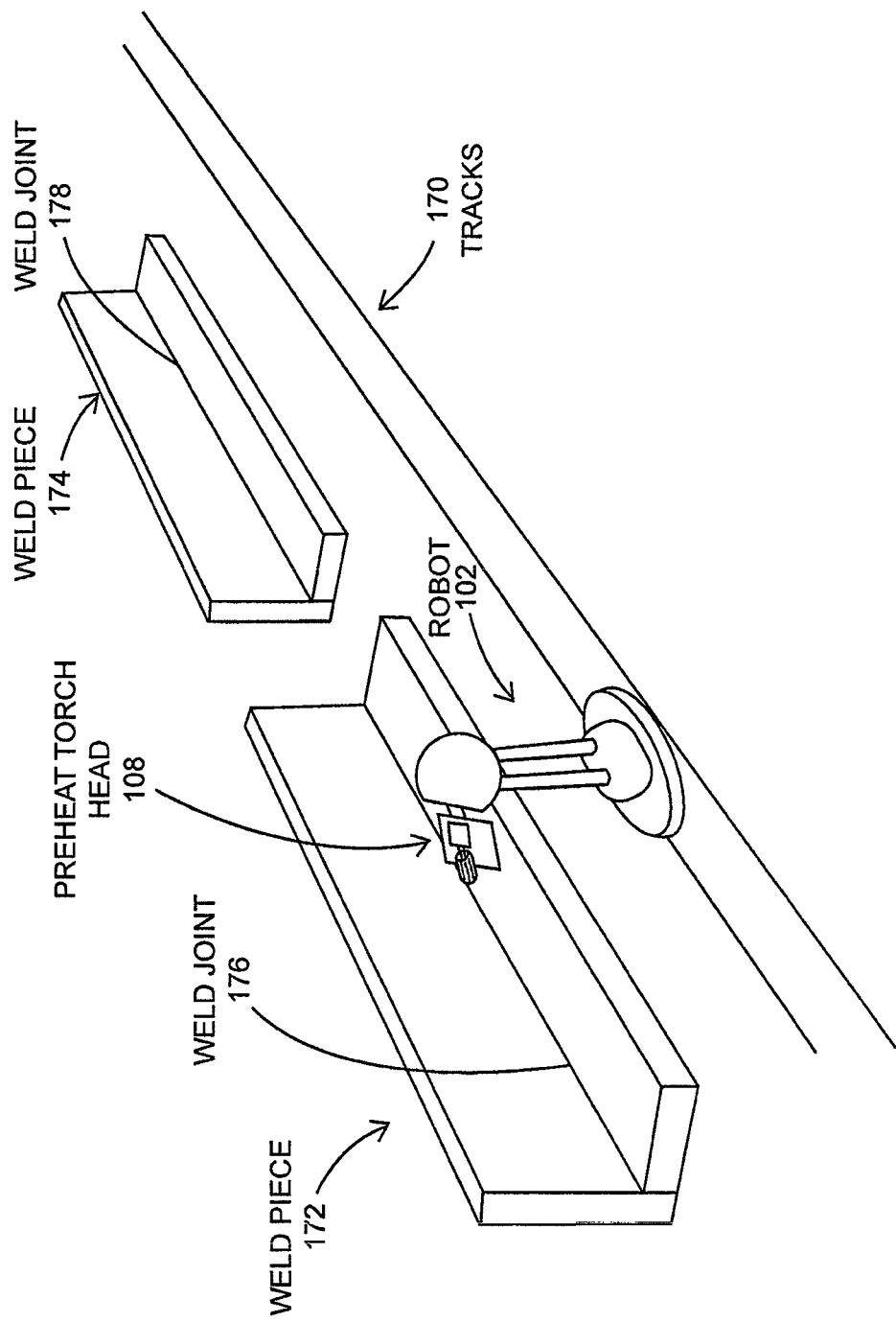
FIG. 4 is a schematic isometric diagram illustrating an embodiment of a robot performing a pre-heating process on a weld piece.

FIG. 4 is a schematic isometric view of an embodiment illustrating the manner in which a pre-heat process may be performed. As illustrated in FIG. 4, robot 102 has retrieved the pre-heat torch head 108. Robot 102 directs the pre-heat torch head 108 on a weld joint 176 of a weld piece 172. Weld piece 172 may comprise two separate plates that can have various thicknesses. For example, the plates of the weld piece 172 may be several inches thick. The pre-heat torch head 108 is directed towards the weld joint 176 to simultaneously heat both of the plates of the weld piece 172. As shown in FIG. 4, the robot 102 moves along tracks 170 and may pass several times along the length of the weld piece 172, so that the weld joint 176 is gradually heated by the pre-heat torch head 108. Of course, the robot 102 does not necessarily need to move along tracks, such as tracks 170. The robot may have a reach that is sufficient to perform the preheating process without movement of the overall robotic device. The boom of the robotic arm could be sufficiently long to allow the robot to reach all of the weld piece 172 and potentially all of the weld piece 174. In addition, the overall robotic device 102 can be moved without tracks 170 using any acceptable guidance device, including being self-propelled on rollers.

Figure 14:
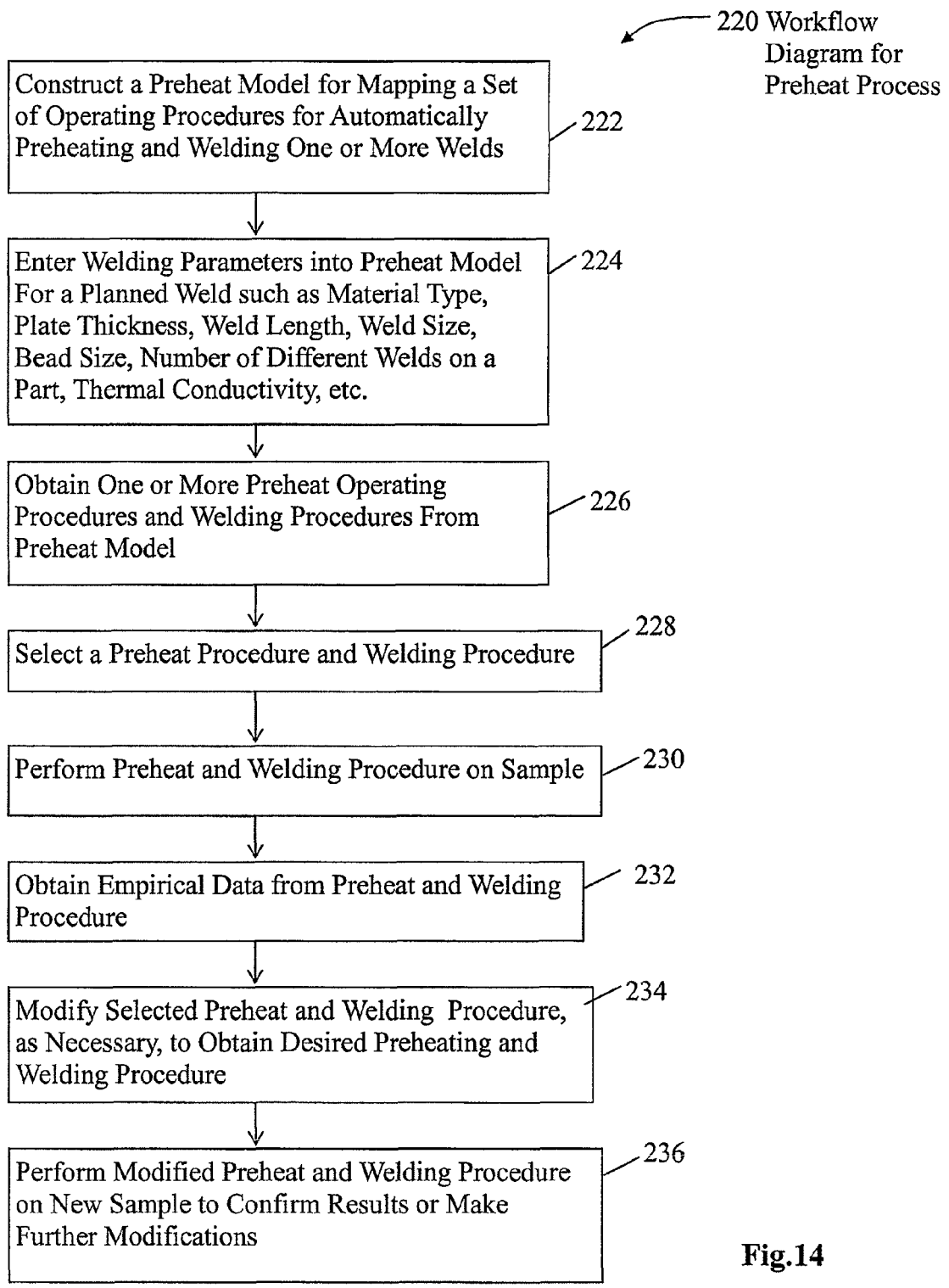
FIG. 14 is a workflow diagram of an embodiment of a pre-heat and welding process.
Figure 15:
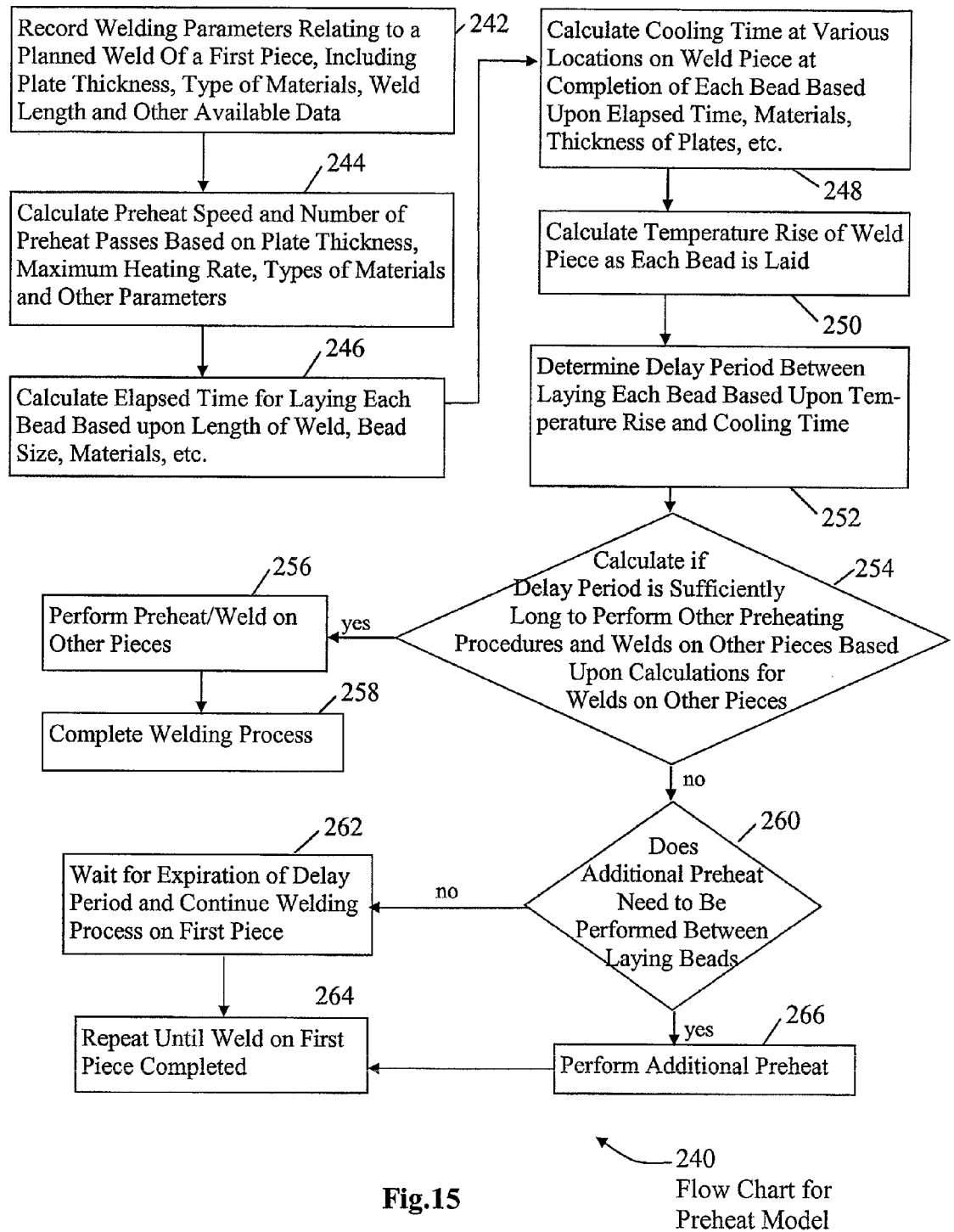
FIG. 15 is a flow chart of an embodiment of a pre-heat model.

As also shown in FIG. 4, temperature sensor 162 (FIG. 2) detects the temperature of the weld joint during heating until the weld joint 176 reaches the desired pre-heat temperature, which is disclosed more particularly with respect to FIGS. 14 and 15. For example, the pre-heat temperature is desirably within a pre-heat temperature range corresponding to the particular metals of the weld piece 172. The pre-heat temperature range is calculated based upon additional heat that is added to the weld joint 176 as weld beads are laid in the weld joint 176. An additional weld piece 174, having a weld joint 178, may also be available for welding, as well as other weld pieces that may be included in a process of pre-heating and welding, to minimize waiting periods and increase the speed of the entire automated process by being able to pre-heat and weld more than one joint. Of course, the preheating system illustrated in FIG. 4 can also be used to control the rate of cooling of the weld pieces 172, 174, as well as the rate of cooling of the weld joints 176, 178. For some alloys, it may be desirable to control the cooling rate of the metal for various reasons. The robot 102 may not only control the preheating of the weld pieces 172, 174, but can also be easily programmed to control the cooling rate of the weld pieces 172, 174 after the welding process has been completed.

Figure 5:
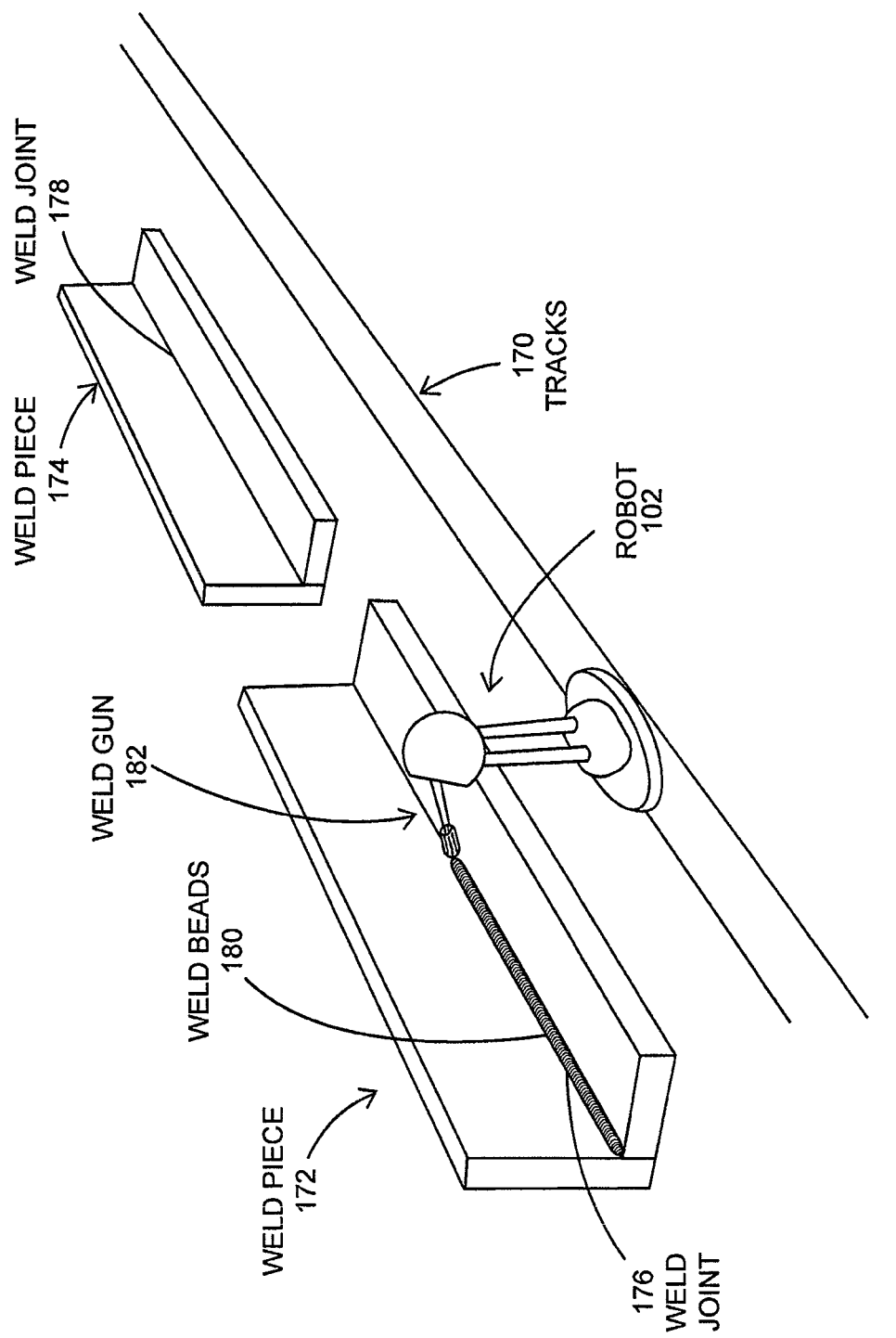
FIG. 5 is a schematic isometric diagram illustrating an embodiment of a robot performing the process of laying weld beads in a weld joint of a weld piece.

FIG. 5 is a schematic illustration of the embodiment of FIG. 1, illustrating the robot 102 having a weld gun 182 that lays multiple weld beads 180 in the weld joint of weld piece 172. Once the weld piece 172 is pre-heated to a selected pre-heat temperature, weld beads 180 are laid by weld gun 182 in the weld piece 172. As each bead, of the multiple weld beads 180, is laid in the weld joint, the temperature of the weld joint 176 increases. During the welding process, it is necessary that the temperature of the weld joint 176 be maintained within a specific pre-heat temperature range to avoid damage and potential problems in the weld. As more weld beads 180 are laid in the weld piece 172, the heat may rise above the predetermined range. If the temperature rises above the predetermined range, the welding process must be delayed. In other words, after laying each bead of the multiple weld beads 180, the temperature monitor senses the temperature of the weld joint 176, and the temperature rise is calculated. If it is determined that the temperature rise for the next bead will exceed the temperature range, the welding process must be halted and the next bead cannot be laid until the temperature decreases to a level that will not cause the weld joint 176 to exceed the temperature range, based upon the temperature increase detected for each bead. In that case, additional weld pieces, such as weld piece 174, can be preheated and welded, so that the overall process is not delayed by the waiting period required for weld piece 172 to cool.

Figure 6:
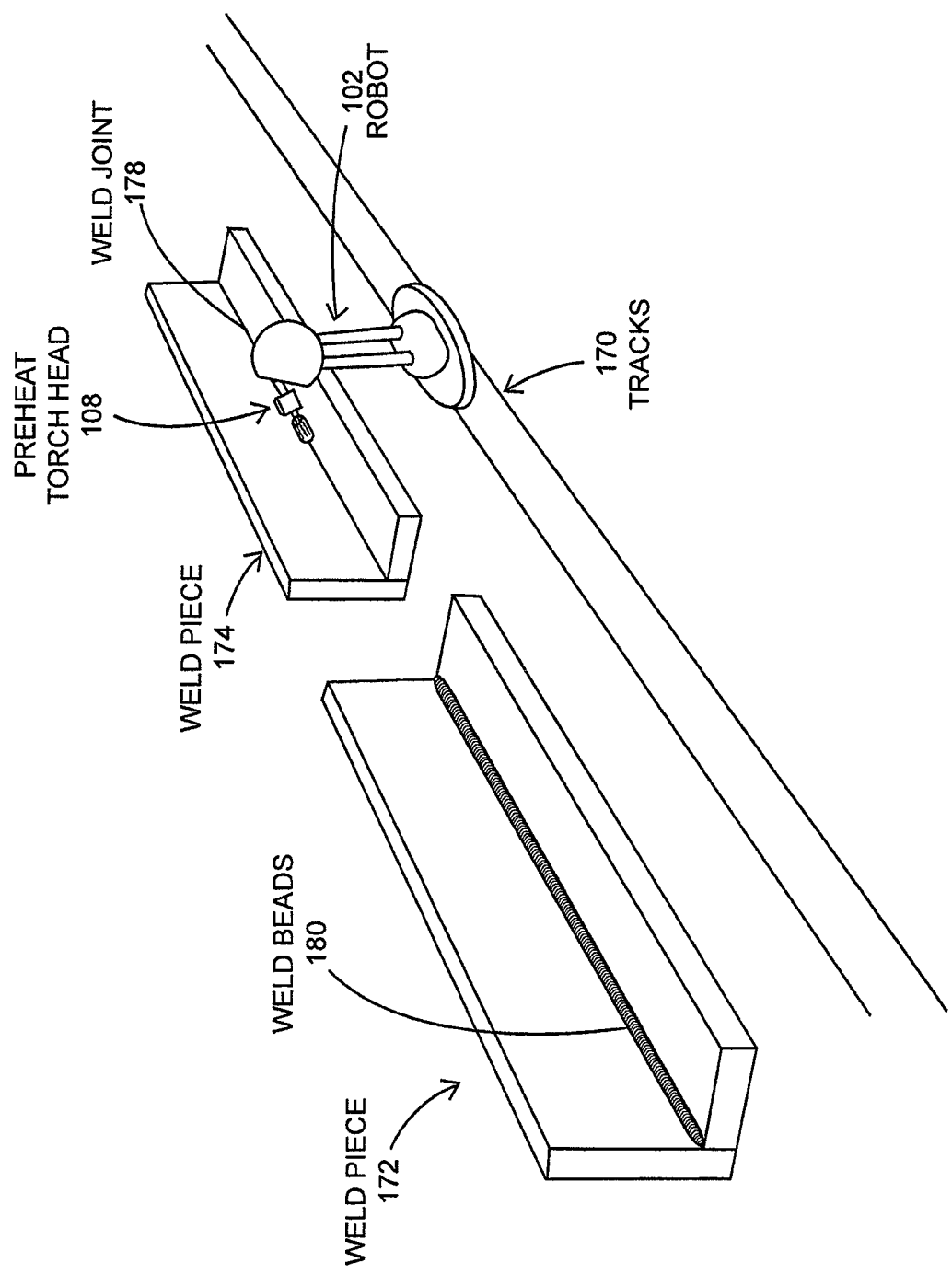
FIG. 6 is a schematic isometric diagram of an embodiment of a robot performing a process of pre-heating a second piece while allowing a first piece to cool.

As illustrated in FIG. 6, robot 102 can proceed to weld piece 174 and begin the pre-heat process. In that regard, the robot 102 can dock the weld gun 182 and retrieve the pre-heat torch head 108 to begin the process of pre-heating the weld joint 178. Robot 102 can travel along tracks 170 and travel across the weld joint 178 to pre-heat the weld joint 178 along the length of the weld joint 178.

Figure 7:
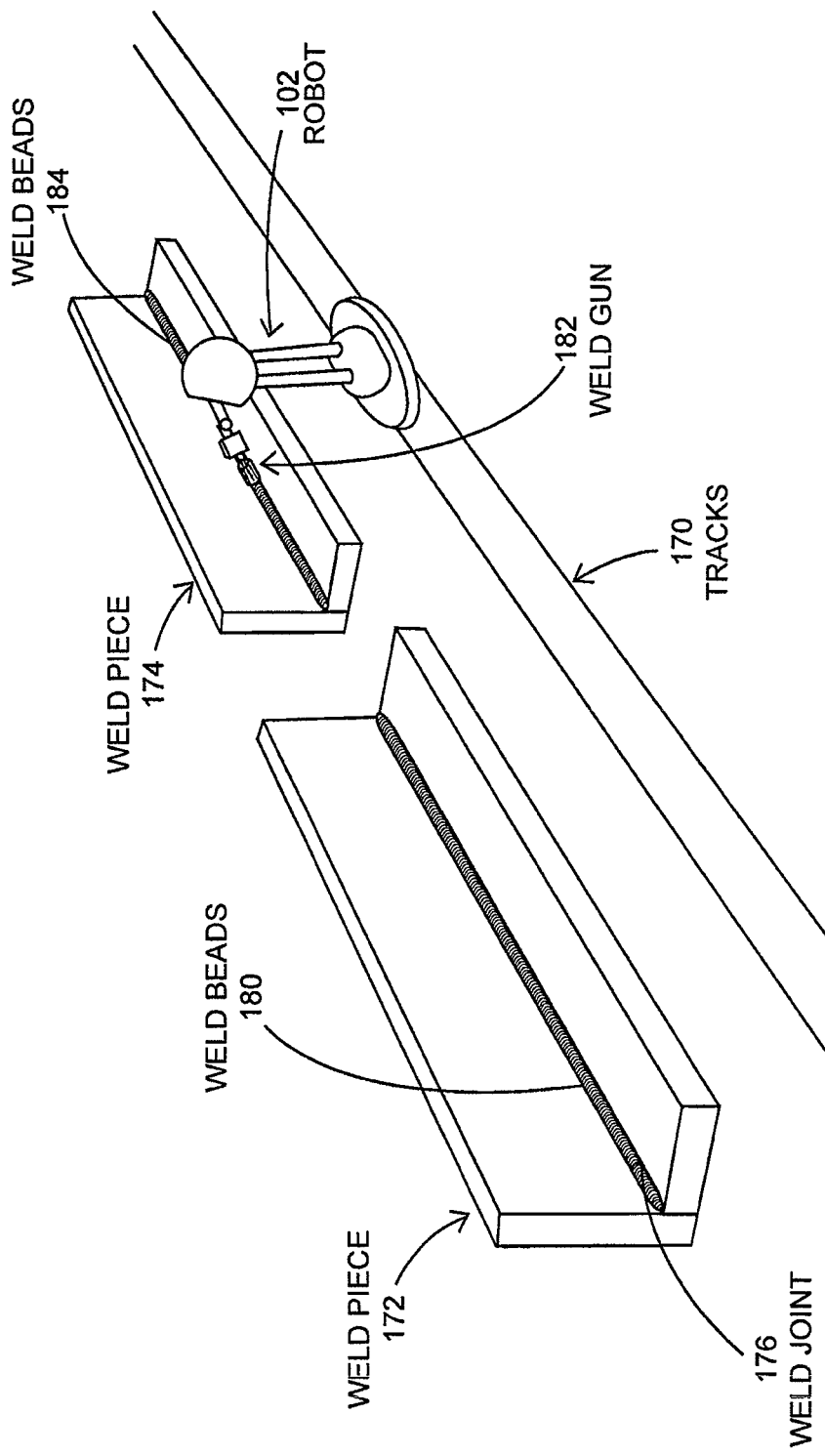
FIG. 7 is a schematic isometric diagram of an embodiment of a robot performing a process of welding a second piece while allowing a first piece to cool.

FIG. 7 is a schematic diagram illustrating the welding of weld piece 174. In the process of waiting for weld piece 172 to cool sufficiently, as a result of the weld beads 180 adding heat to the weld joint 176, the process of welding the weld piece 174 can proceed. As illustrated in FIG. 7, robot 102 docks the pre-heat torch head 108 and retrieves the weld gun 182. Weld gun 182 is used to lay weld beads 184 by moving the robot 102 along tracks 170. As the temperature of the weld piece 174 increases as a result of laying of the weld beads 184, the robot 102 can then return to continue the process of welding the weld piece 172. In this manner, waiting times that allow the weld pieces to cool sufficiently do not delay the overall welding process. Of course, additional weld pieces (that constitute more than two pieces) can also be welded using this process.

Pre-heat temperatures that provide the beneficial effects of a welding process comprise a range of temperatures, as indicated above. Of course, the pre-heat temperatures are dependent upon the type of material, as well as other factors, such as the thickness of the material. Exotic aluminum alloys have a much lower pre-heat temperature than cast iron plates, for example. For standard ferrous alloys, pre-heat temperatures in the range of approximately 270° F. to about 600° F. constitute typical, acceptable pre-heat ranges. However, preheat ranges can vary greatly, even for standard ferrous alloys. More exotic alloys may have even a greater need to cool slowly and may have a narrower range of acceptable pre-heat temperatures. In that regard, if a very long weld is to be performed, a pre-heat model may require a pre-heat temperature that is higher in the pre-heat temperature range to be used, so that an end portion of the weld piece does not cool below the pre-heat range prior to having a weld bead deposited on that end portion. This may be particularly relevant with materials that have lower heat conductivity, since the heat generated by the welding process may not be communicated quickly through the weld joint. For example, for a weld that may be tens of feet long on thinner plates of materials that do not have a high thermal conductivity, the far end of the weld may cool to a temperature below the acceptable pre-heat temperature range prior to the welding head reaching the far end of the weld piece, if the weld piece has not been preheated to a temperature level that is in a higher portion of the acceptable pre-heat temperature range, since the weld is very long and the heat from the weld is not effectively transmitted to the far end of the piece during the welding process. For these reasons, a pre-heating model must consider the cooling rate, the thermal conductivity of the materials, and the thickness of the materials with respect to the ability of these materials to hold the heat and maintain the temperature of the pieces. Of course, very thin pieces will cool rapidly when compared to thick pieces that are better able to store heat.

Figure 8:
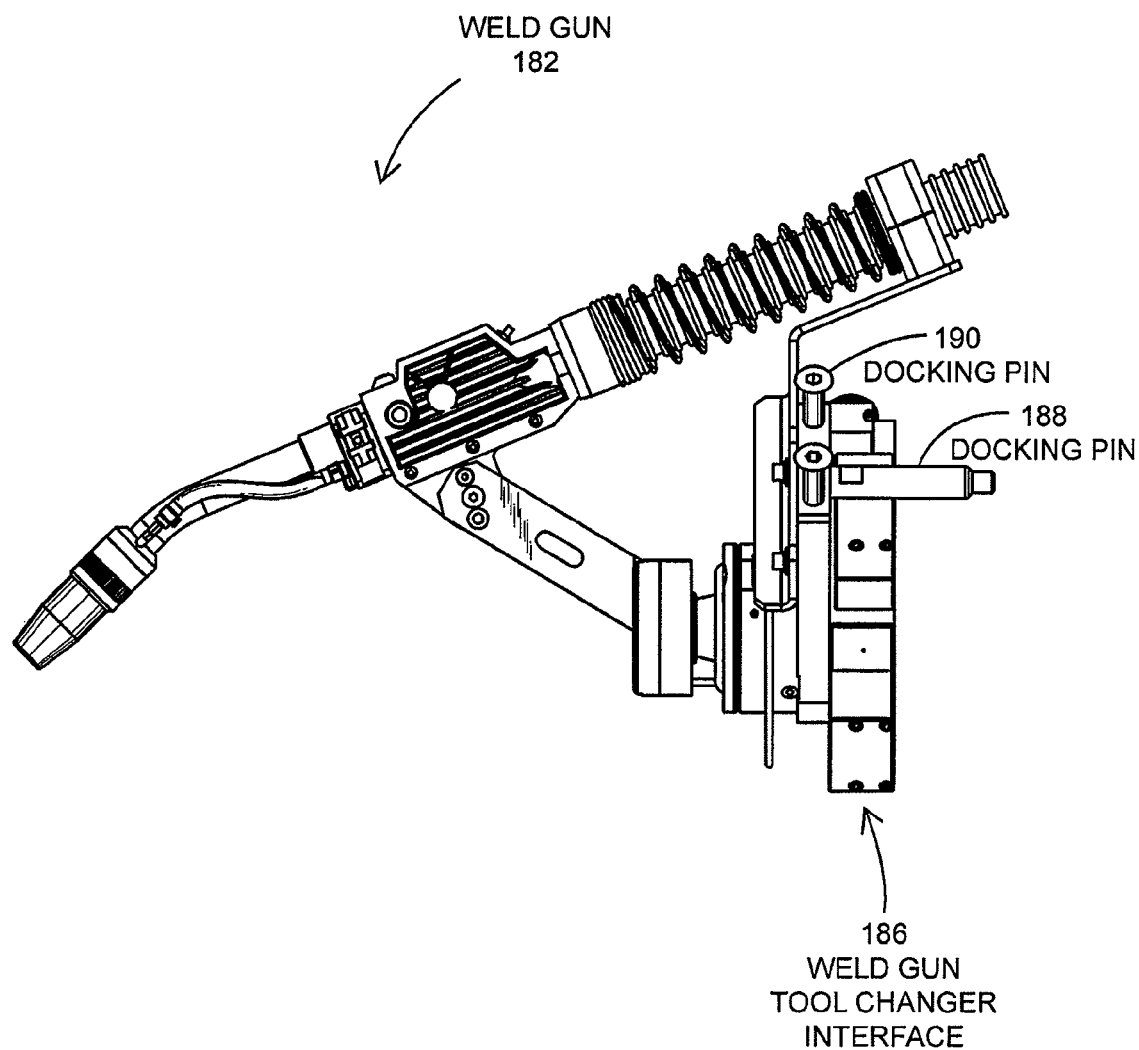
FIG. 8 is a side view of an embodiment of a weld gun.

FIG. 8 is a side view of an embodiment of a weld gun 182. As illustrated in FIG. 8, weld gun 182 includes a weld gun tool changer interface 186 that couples to the tool changer interface 106 that is connected to the robot 102. A docking pin 188 is also illustrated in FIG. 8. Docking pin 188 allows the weld gun 182 to be docked at a docking station.

Figure 9:
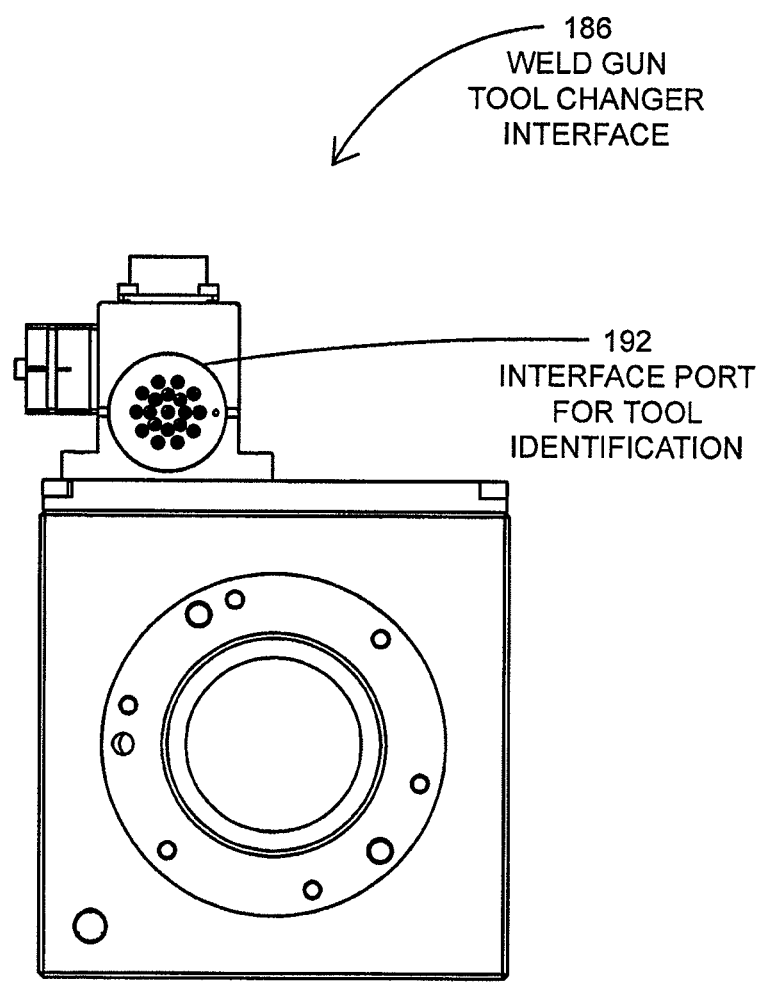
FIG. 9 is an end view of an embodiment of a weld gun tool changer interface.

FIG. 9 is an end view of weld gun tool changer interface 186. As illustrated in FIG. 9, an interface port 192 is provided, which communicates tool identification information.

Figure 10:
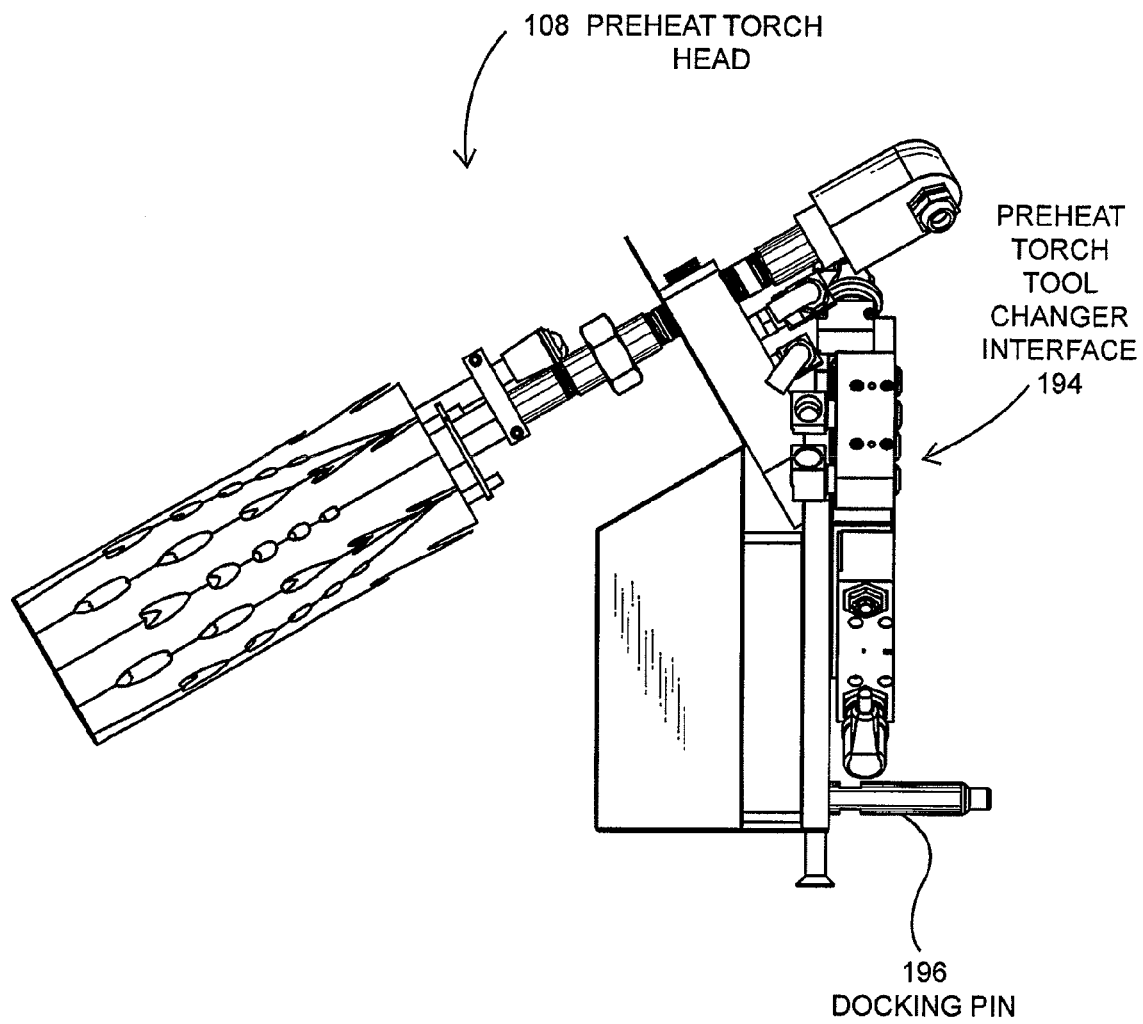
FIG. 10 is a side view of an embodiment of a pre-heat torch head.

FIG. 10 is a side view of an embodiment of a pre-heat torch head 108. As illustrated in FIG. 10, the pre-heat torch head 108 includes a pre-heat torch tool changer interface 194 that couples to tool changer interface 106 (FIG. 1) mounted on the robot 102. The pre-heat torch 108 also includes a docking pin 196 for docking the pre-heat torch head 108.

Figure 11:
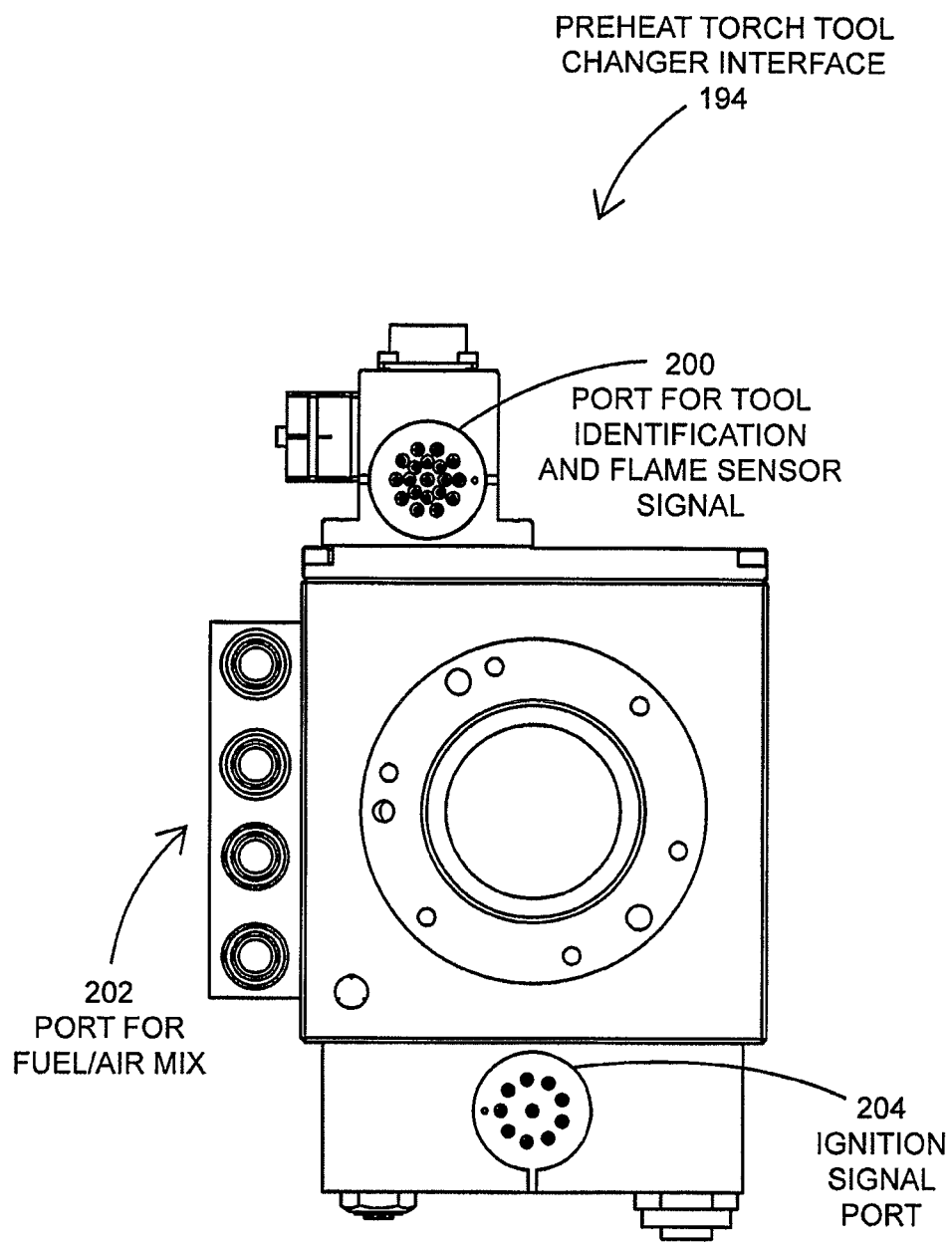
FIG. 11 is an end view of an embodiment of a pre-heat torch tool changer interface.

FIG. 11 is an end view of pre-heat torch tool changer interface 194. As illustrated in FIG. 11, pre-heat torch tool changer interface 194 includes ports 202 for the air/fuel mix that is supplied to the pre-heat torch 150. Port 200 is for tool identification and for transmitting flame sensor signal 136. Ignition signal port 204 provides a port for transmitting the igniter signal.

Figure 12:
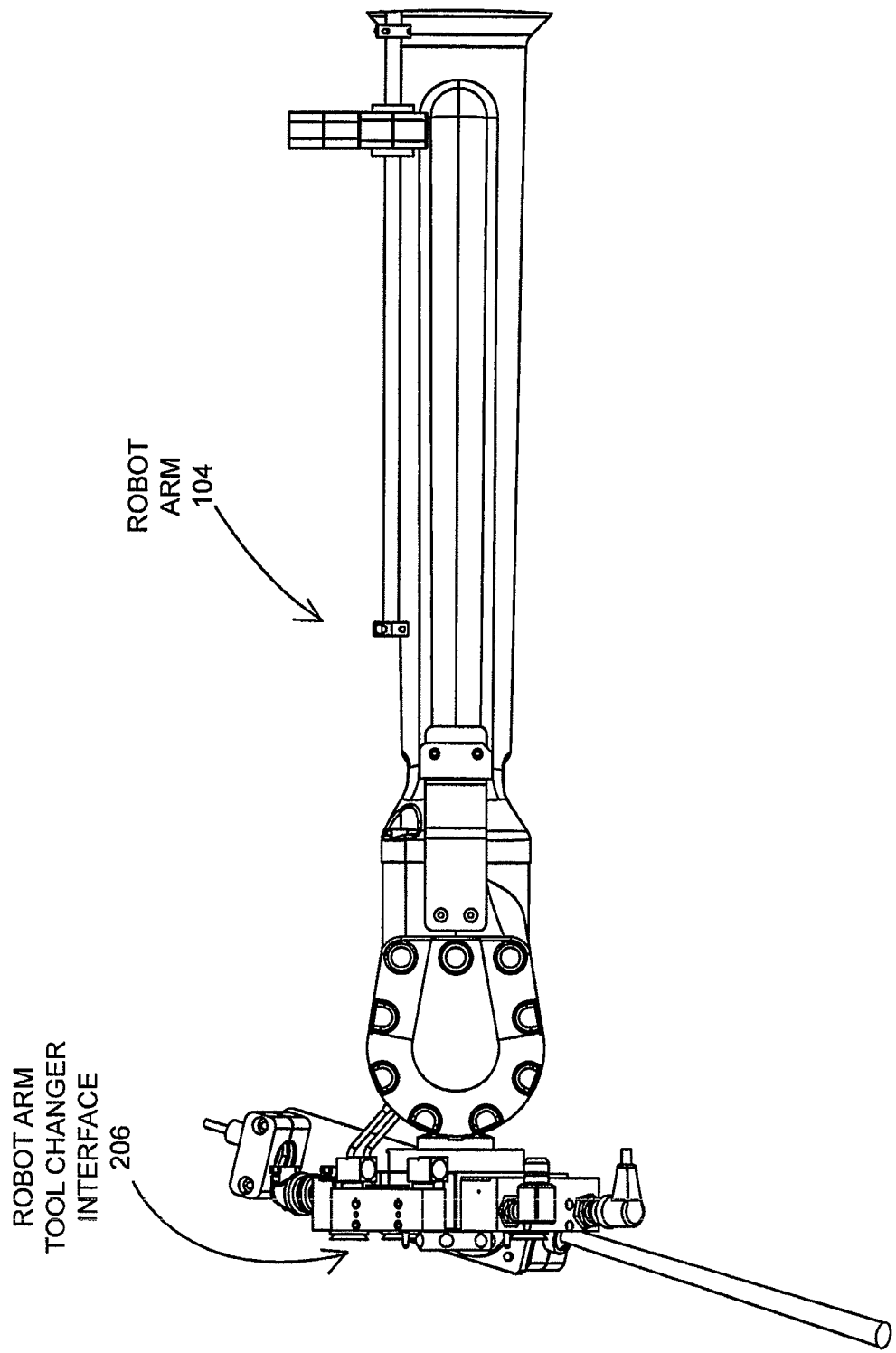
FIG. 12 is a top view of an embodiment of a robotic arm and a robotic tool changer interface.

FIG. 12 is a top view of an embodiment of a robot arm 104 and robot arm tool changer interface 206.

Figure 13:
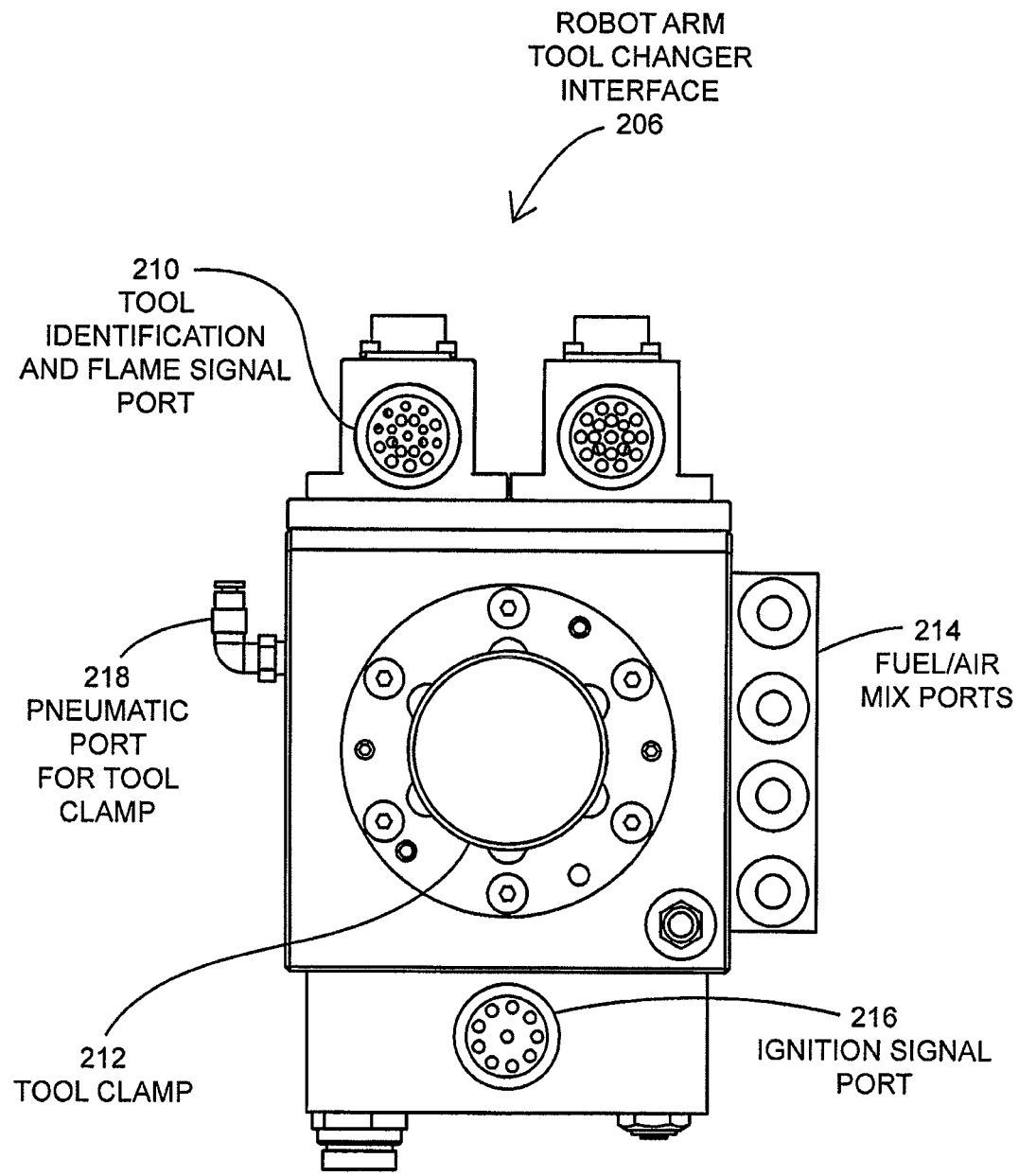
FIG. 13 is an end view of an embodiment of a robotic arm tool changer interface.

FIG. 13 is an end view of robot arm tool changer interface 206. As illustrated in FIG. 13, robot arm tool changer interface 206 includes tool identification and flame signal port 210, and a pneumatic port 218 for clamping the weld gun 110 and pre-heat torch 108 to the robot arm 104 using tool clamp 212. FIG. 13 also illustrates the fuel/air mix ports 214 for transmitting fuel/air mixtures. Ignition signal port 216 provides a port for transmitting ignition signals.

FIG. 14 illustrates a workflow diagram for performing the pre-heat process. As illustrated in FIG. 14, at step 222, a pre-heat model is constructed for mapping a set of operating procedures for automatically pre-heating and welding one or more weld pieces. At step 224, welding parameters are entered into the pre-heat model for a planned weld, which include parameters such as material type, plate thickness, weld length, weld size, bead size, number of different welds on a part, thermal conductivity, and other parameters. For example, known cooling rates, and other information can be entered into the model. At step 226, the model produces one or more pre-heat procedures and welding procedures from the pre-heat/welding model. At step 228, a pre-heat and welding procedure is selected. The selection of a pre-heat/welding procedure may be based upon factors such as total elapsed time, productivity, quality assurances, and other factors relating to the pre-heat/welding process. At step 230, the selected pre-heat/weld procedure is performed on a sample. At step 232, empirical data from the pre-heat procedure on the sample is collected to determine the predictive success of the pre-heat/welding model. At step 234, the selected pre-heat/welding procedure is modified, as necessary, to obtain a desired result. At step 236, the modified procedure is performed on a new sample to confirm results or make further modifications.

FIG. 15 is a flow chart 240 illustrating an embodiment of an exemplary pre-heat model. At step 242, welding parameters that relate to the planned weld of the first piece are recorded and utilized in the model, including parameters such as plate thickness, type of materials, weld length, thermal conductivity, and other available data. At step 244, the speed that the robot moves the torch along the weld joint, and the number of passes along the weld joint, is calculated based upon the nature of the weld to be performed, such as plate thicknesses, maximum heating rate, the types of materials being welded, thermal conductivity, and other parameters. At step 246, the elapsed time for laying each bead is calculated, based upon the length of the weld, the bead size, materials being welded, and other available data. At step 248, the cooling time at various locations on the weld piece are calculated at the completion of the laying of each bead based upon the elapsed time, the materials utilized, the thickness of the plates and other available data. At step 250, the temperature rise of the weld piece is calculated for each bead that is laid. At step 252, the delay period between the laying of each bead is determined, based upon the temperature rise and cooling time. At step 254, it is determined if the delay period is sufficiently long to perform other pre-heating procedures and welds on other pieces, based upon calculations for pre-heating and welds on other pieces. If the delay period is sufficiently long, a pre-heating and welding process is performed on one or more other pieces, at step 256. At step 258, the original welding process is completed. If the delay period is insufficient to perform other pre-heating and welding procedures at step 254, it is determined at step 260 if additional pre-heating needs to be performed between each of the laying of beads. If not, the process waits for the expiration of the delay period and continues the welding process on the first piece. This process is repeated until the welding is completed on the first piece. If additional pre-heating needs to be performed between the laying of each of the beads, as determined at step 260, additional pre-heating is performed at step 266.

Hence, the various embodiments disclose automated ways of pre-heating and welding one or more weld pieces, while maintaining pre-heating temperatures within a predetermined pre-heat range that produces beneficial results in the welded joint. A single robot can be used to both pre-heat and weld, since both a pre-heating torch 108 and a welding gun 110 can be separately attached to the single robot 102. Of course, additional robots can be utilized, if desired. In that regard, one robot could be used for pre-heating, while the other robot is used for welding. Both robots may include a temperature sensor probe to ensure proper pre-heating nad proper temperature of the work piece during the welding process. Welds can be performed on additional pieces if cooling time is required on a first piece being welded. In that manner, the overall process of performing welding procedures can be reduced.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically preheating and welding a weld piece using a robot comprising:
- obtaining welding parameters for a planned weld of a weld piece;
- entering said welding parameters in a preheat and welding model;
- generating operating parameters for preheating and welding said weld piece using said preheat and welding model, wherein said process comprises:
  - calculating a speed of movement of a preheat torch and a number of passes of said preheat torch across a weld joint based upon plate thickness, maximum heating rate and type of material of said weld piece,
- performing a sample weld using said operating parameters;
- collecting empirical data from said sample weld;
- comparing said empirical data with operating parameter limits;
- performing said preheating and welding process on said weld piece if said operating parameter limits are not exceeded;
- modifying said preheat and welding model if said operating parameter limits are exceeded using said empirical data to produce a modified preheat and welding model for performing said preheating and welding process on said weld piece.

2. A method of automatically preheating and welding a weld piece using a robot comprising:
- obtaining welding parameters for a planned weld of a weld piece;
- entering said welding parameters in a preheat and welding model;
- generating operating parameters for preheating and welding said weld piece using said preheat and welding model, wherein said process of generating operating parameters further comprises:
  - calculating elapsed time for laying each bead in said welding model based upon welding parameters comprising weld length;
  - calculating cooling time of said weld piece based upon said welding parameters;
  - calculating temperature rise of said weld piece after laying each bead;
  - determining a delay period between said laying of each bead based upon said temperature rise, said cooling time and said elapsed time;
- performing a sample weld using said operating parameters;
- collecting empirical data from said sample weld;
- comparing said empirical data with operating parameter limits;
- performing said preheating and welding process on said weld piece if said operating parameter limits are not exceeded;
- modifying said preheat and welding model if said operating parameter limits are exceeded using said empirical data to produce a modified preheat and welding model for performing said preheating and welding process on said weld piece.

3. The method of claim 2 further comprising:
- calculating a time period required to preheat and weld an additional weld piece;
- comparing said time period required to preheat and weld said additional weld piece with said cooling time;
- performing said preheat and weld on said additional weld piece if said time period required to preheat and weld said additional piece is less than said cooling time.

4. A system for automatically preheating and welding a work piece comprising:
- a robot having a robot arm;
- a tool changer interface mounted on said robot arm;
- a preheat torch having a preheat torch interface that couples to said tool changer interface on said robot arm so that said robot can access said preheat torch to preheat said weld piece and dock said preheat torch in a docking station;
- a welding gun having a welding gun interface that couples to said tool changer interface on said robot arm so that said robot arm can access said welding gun to weld said weld piece, and dock said welding gun in said docking station so that a single robot can perform both preheating and welding;
- a controller that uses welding parameters of a first weld piece in a preheat and welding model to generate operating instructions to control said robot to automatically preheat said weld piece so that said weld piece has a temperature level that is within a range of predetermined preheat temperatures during said weld:
- a mixing controller that controls mixing of air and fuel for said preheat torch in response to a mixing control signal generated by said controller.

5. The system of claim 4 wherein said controller further comprises:
- a controller that generates said operating instructions by calculating an elapsed time for laying each bead, and a cooling time of said weld piece by calculating a temperature rise of said weld piece for each weld bead, and by determining a delay period between laying each weld bead based upon said temperature rise, said cooling time, and said elapsed time.

6. The system of claim 5 wherein said controller further comprises:
- a controller that generates said operating instructions by calculating a time period required to preheat and weld a second piece, comparing said time period required to preheat and weld said second weld piece with said cooling time and performing preheating and welding on said second weld piece if said time period required to preheat and weld said second weld piece is less than said cooling time.

* * * * *